(12) United States Patent
Krane

(10) Patent No.: US 7,861,310 B2
(45) Date of Patent: Dec. 28, 2010

(54) RUNTIME MODIFICATION OF CLIENT USER CONTROLS

(75) Inventor: Rolf Krane, Wiesloch (DE)

(73) Assignee: SAP AG, Walldorf (DE)

( * ) Notice: Subject to any disclaimer, the term of this patent is extended or adjusted under 35 U.S.C. 154(b) by 1201 days.

(21) Appl. No.: 11/457,672

(22) Filed: Jul. 14, 2006

(65) Prior Publication Data

US 2008/0016555 A1    Jan. 17, 2008

(51) Int. Cl.
*G06F 17/30* (2006.01)
(52) U.S. Cl. .................... 726/26; 715/741; 709/203
(58) Field of Classification Search .............. 726/1, 726/5, 26, 27–29; 713/188; 709/201–203, 709/217; 715/700, 735–741, 762
See application file for complete search history.

(56) References Cited

U.S. PATENT DOCUMENTS

| | | | | |
|---|---|---|---|---|
| 5,959,624 A | * | 9/1999 | Johnston et al. ............. | 715/746 |
| 6,727,919 B1 | * | 4/2004 | Reder et al. ................. | 715/810 |
| 7,149,810 B1 | * | 12/2006 | Miller et al. ................ | 709/246 |
| 7,240,360 B1 | * | 7/2007 | Phan ............................. | 726/2 |
| 2001/0020255 A1 | * | 9/2001 | Hofmann et al. ............ | 709/318 |
| 2007/0094608 A1 | * | 4/2007 | Getsch ........................ | 715/762 |
| 2007/0234195 A1 | * | 10/2007 | Wells ....................... | 715/501.1 |

* cited by examiner

*Primary Examiner*—Nirav Patel
(74) *Attorney, Agent, or Firm*—Mintz, Levin, Cohn, Ferris, Glovsky and Popeo, P.C.

(57) ABSTRACT

Methods and apparatus, including computer program products, for modifying a user interface of a client application. A method includes rendering a graphical user interface of a client application having a first and second control coupled to the client application, receiving user-generated input characterizing a request to modify the first control and a selection of a third control; exchanging the first control with the third control; rendering the graphical user interface of the client application as having the third control in lieu of the first control; receiving user-generated input characterizing interaction with the second control; and rendering the third control to reflect the interaction with the second control.

23 Claims, 15 Drawing Sheets

FIG. 1F

RUNTIME MODIFICATION OF CLIENT USER CONTROLS

BACKGROUND

The subject matter disclosed herein relates to data processing by digital computer in a client/server landscape, and more particularly to runtime modification of controls of a client application.

In a client/server system, clients may be used for user interaction with services offered by a server. The clients may have a combination of user interface components that may be used for the services. The user interfaces at the clients may include user interface controls that, for example, allow for interaction through user input that is received at the controls and relayed to a server. In response to input received at a server from user interface controls at a client, data may be sent to a client as part of an offering of services.

SUMMARY

The subject matter disclosed herein provides methods and apparatus, including computer program products, that implement techniques for runtime modification of client user controls.

In one general aspect, the techniques feature a method that includes rendering a graphical user interface of a client application having a first and second control coupled to the client application, receiving user-generated input characterizing a request to modify the first control and a selection of a third control; exchanging the first control with the third control; rendering the graphical user interface of the client application as having the third control in lieu of the first control; receiving user-generated input characterizing interaction with the second control; and rendering the third control to reflect the interaction with the second control. In that method, the client application includes at least one input and at least two outputs for services offered by a server computer program. The first control is coupled to the client application such that an input of the first control is bound to a first one of the client application outputs and an output of the first control is bound to the client application input (e.g., bindings exists to the client application output and input). The second control is coupled to the client application such that an input of the second control is bound to a second one of the client application outputs. User-generated interaction with the second control causes a display of data at the coupled first control to change, where the data received at the client application is from the server computer program. Exchanging the first control with the third control is performed by remapping (e.g., by generating a binding with) the one input and the first one of the two outputs of the client application such that the input and output of the first control become input and output of the third control, respectively.

In another method, input characterizing a request to modify a control of a graphical user interface may be received. The control may be modified and a modified graphical user interface may be rendered.

Other aspects may include a computer program product, embodied in a tangible media, to cause data processing apparatus to perform operations similar to features of any of the methods.

Another aspect may include a system including a first and second control, and a client application. In that system, a first control includes an input and an output coupled to a server computer program, the second control includes an input coupled to the server computer program, and the client application includes one input and at least two outputs for services offered by the server computer program. An input of the first control is bound to a first one of the client application outputs, an output of the first control is bound to the client application input, and an input of the second control is bound to a second one of the client application outputs. The client application is operable to perform operations that include rendering a graphical user interface including the first control and the second control; causing a display of data at the first control to reflect user-generated interaction with the second control, where the data received at the client application from the server computer program; receiving user-generated input characterizing a request to modify the first control and a selection of a third control; exchanging the first control with the third control by rebinding the one input and the first one of the two outputs of the client application such that the input and output of the first control become input and output of the third control, respectively; rendering the graphical user interface of the client application as having the third control in lieu of the first control; receiving user-generated input characterizing interaction with the second control; and rendering the third control to reflect the interaction with the second control.

The subject matter disclosed herein may be implemented to include one or more of the following advantageous features. Rendering the third control may be in response to an interaction from the server computer program and the display of the third control may include information from the server computer program.

The operations or method may further include rendering a series of dialog boxes to assist a user to select and map the input and the first one of the outputs of the client to the output and input of the third control, respectively.

The operations or method may further include presenting a set of controls for selection by a user, where the set of controls includes the third control. Presenting the set may include presenting controls having input being mappable to the output of the client application (e.g., and not presenting controls that have input, output, or both, that are not mappable). Rendering the graphical user interface as having the third control may include displaying information from the server computer program in the third control.

Exchanging the first control with the third control may occur while the graphical user interface is being displayed and such that user interaction, with a designtime environment having a designtime version of the client application, is obviated. Exchanging the first control with the third control may occur in a WYSIWYG ("What You See Is What You Get") environment during runtime (e.g., selecting a control during runtime and being able to see the customized control during runtime).

Exchanging may include exchanging the first control with the third control by a default binding of the one input and the first one of the two outputs of the client application to the input and output of the third control, respectively. For example, interfaces for replacement controls may be predefined by the first control (or user interface). Controls for a replacement may implement this interface to provide a default binding.

The operations or method may further include storing the selection of the third control as being associated with a user of the client application.

The operations or method may further include generating a copy of the client application, where the copy is restricted such that modification of the first and third controls as part of the graphical user interface is prohibited. The operations may include rendering the client application such that modification of the first and third controls as part of the graphical user interface is prohibited The output of the third control may include output data (e.g., properties whose values are output) and exchanging may include a many to one binding of the output data of the third control to a single input data of the client application (e.g., properties whose values are input of the client application).

Each of the first and third controls may have respective, associated control logic and the exchanging may include exchanging the respective, associated control logic of the first and third controls.

The subject matter disclosed herein may be implemented to realize one or more of the following advantages. Components of a user interface (e.g., user interface controls) of a client application may be modified on a component-by-component basis (e.g., on a granularity level of controls rather than, e.g., restricted to a change of an entire user interface). The modification may include replacing controls or adding new controls to a user interface, or modifying existing controls (e.g., modifying a binding of properties of a control to context data of a client application). Modification may be performed for groups of controls, which may be aggregated into a container control. For example, a first group of controls may be replaced with a second group of controls.

Once a series of one or more modifications of controls has been completed, a client application may be finalized such that further modifications are not possible. This may assist, for example, in the configuration and branding of client applications. For example, a bank may receive a client application with modifiable controls from a software vendor. The bank may modify the controls and finalize the client application for use by customers of the bank such that customers are unable to modify the controls as the bank was able to modify the controls.

A series of dialogue boxes may be used to assist a user in modifying a graphical user interface of a runtime version of a client application such that, for example, a user need not be aware of software intricacies to customize the client application. For example, by providing a series of dialogue boxes that assist in choosing a binding of properties of a control to context data of a client application and modifying the client application to incorporate a selected binding, a user need not edit source code to customize the client application.

The modification of controls may include the addition of controls that have corresponding logic such that, for example, new or different functionality may be provided in a modified client application. For example, a client application may be modified to add functionality for user input through a touch screen by including drivers that translate input from a touch screen device and larger buttons that are suitable for a touch screen. As another example, a text field may be replaced with a text field that includes automatic spell-checking logic.

As controls may be modified at the client application, a corresponding server application need not be changed to interact with a client application having modified controls.

Details of one or more implementations are set forth in the accompanying drawings and in the description below. Further features, aspects, and advantages will become apparent from the description, the drawings, and the claims.

BRIEF DESCRIPTION OF THE DRAWINGS

FIGS. 1A-1G include a series of example displays of a process of modifying a graphical user interface of a client application to include a dialer user interface control.

Like reference numbers and designations in the various drawings indicate like elements.

DETAILED DESCRIPTION

Figure 1A:
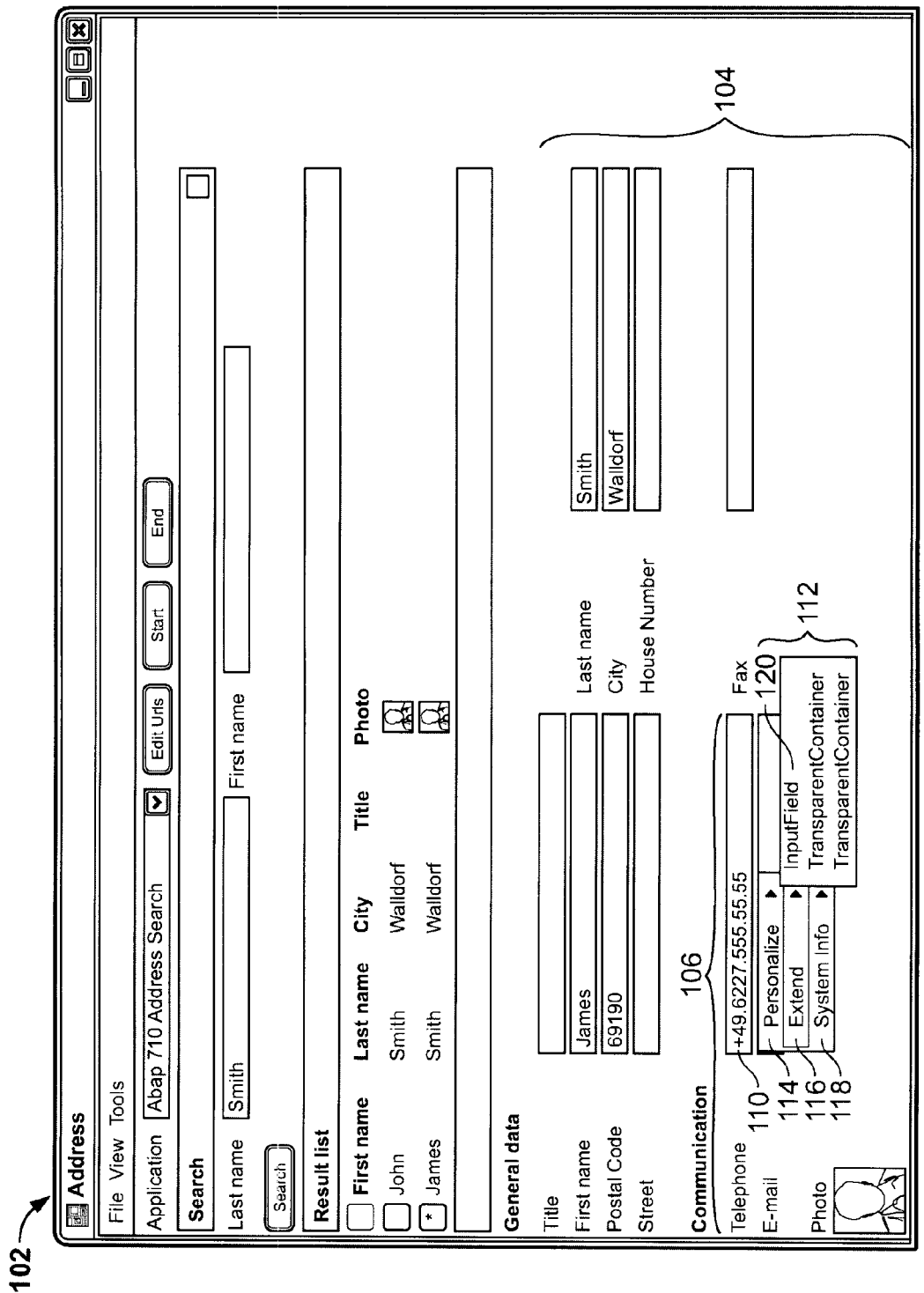
Figure 1B:
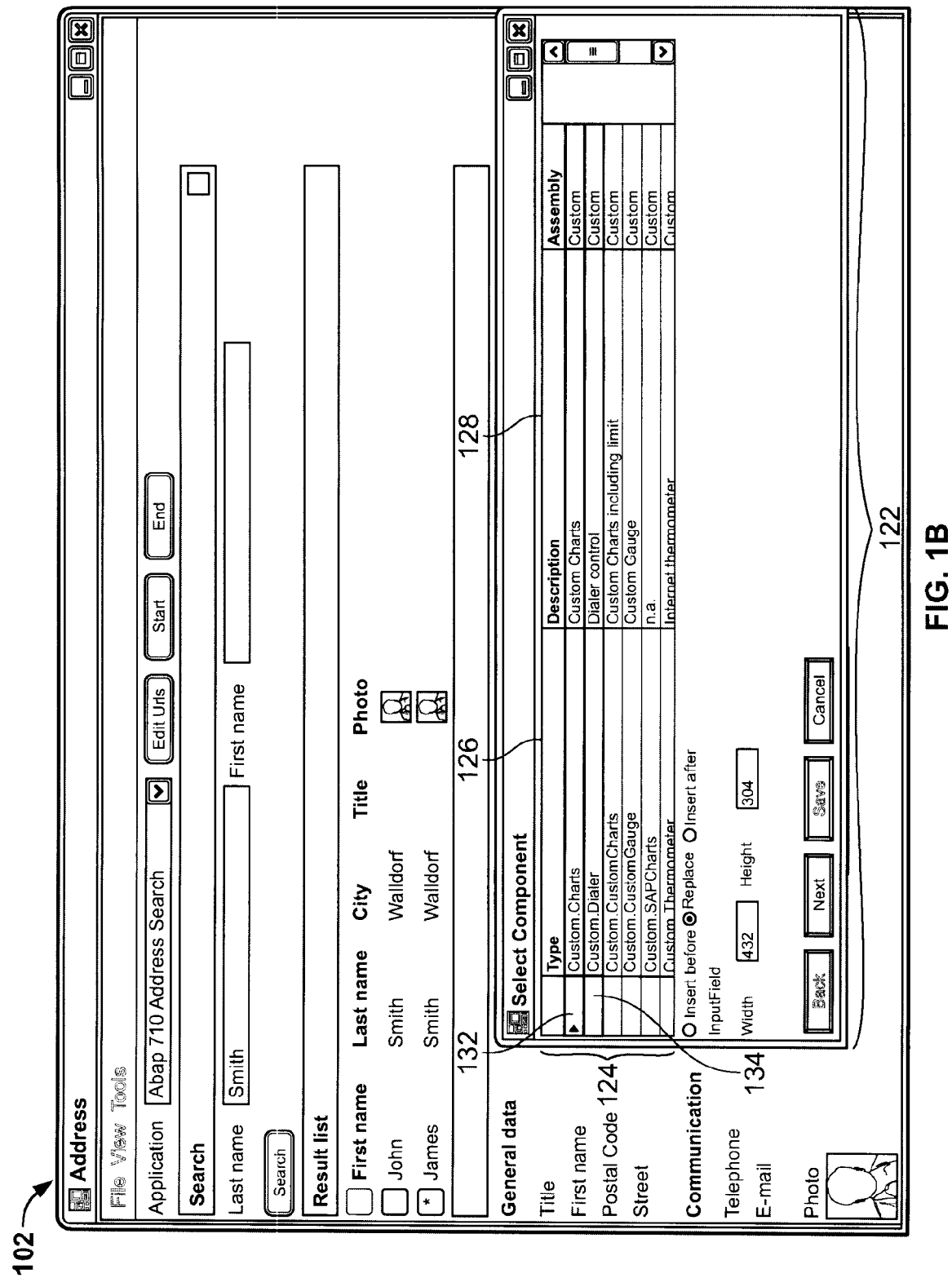

In general, FIGS. 1A-1G, 2A-2P, FIG. 3, and FIG. 4 relate to modification of user interface controls of graphical user interfaces. As used in reference to features of FIGS. 1A-1G, 2A-2P, FIG. 3, and FIG. 4, clients are clients in the sense of being client programs (e.g., client applications; e.g., a client program having a client/server relationship with a server program); although, the term client, as used herein, may refer to a client system (e.g., a computer system where a client program resides and the computer system having a client/server relationship with a server computer system). In any case, a client program may be referred to as a tool (e.g. a computer program), and, that tool may be used to access services offered by a server program. Also, a client program may be made of one or more computer programs (e.g., a client program may be an amalgamation of multiple programs). Similarly, the term server may be used in the sense of being a server program; although, the term server, as used herein, may refer to a server system (e.g., a computer system where a server program resides). A computer system may be a client system or server system by having a client or system program, respectively, residing on the computer system, where, from the view of the relationship of a client and server program, a client/server relationship may exist. A computer system need not be only a client system or a server system. For example, for one set of client and server programs, a computer system may be a client system by having a client program; yet, the computer system may be a server system by having a server program from another set of client and server programs. Although some of the figures depict a single server, a client/server system need not be limited to one server. Also, a client/server system may have periods during which clients and servers are not connected to each other. Similarly, a client need not be connected to a server to be considered a client (e.g., a client may be developed for use in obtaining services without a specific server being considered).

Also, as used in reference to features of FIGS. 1A-1G, 2A-2P, FIG. 3, and FIG. 4, controls are user interface controls, which may be user interface components that may be manipulated through user interaction and may provide output to a user. Controls may relay user-generated input to other components of a computer program (or other computer programs) or may have associated logic which performs processing of input received as user interaction and transforms that input to other types of output. As examples, a text box may receive a number value that is relayed as-is to another component of a client, or a text box may have associated logic that transforms numerical input to a normalized value and relays the normalized value to another component of a computer program.

FIGS. 1A-1G include a series of example displays of a process of modifying a graphical user interface 102 of a client application to include a dialer user interface control 146. The client application allows a user to retrieve search results for searches of users in an address book, where data for addresses may be located at a server and the server performs searches requested by a user.

In FIG. 1A, the graphical user interface 102 includes graphical user interface components 104 that relate to a search result, such as telephone user interface components 106. The telephone user interface components 106 include a telephone text box 110 for displaying a telephone number. The text box 110 is a user interface control, which beyond displaying a telephone number, allows a telephone number to be entered by a user.

FIG. 1A includes a depiction of a context menu 112 for the telephone text box 110. The context menu 112 may appear in response to a right click of a mouse in a mouse-driven user interface. The context menu 112 includes several first level options, including an option to personalize the text box 114, an option to extend the text box 116, and an option for obtaining system information 118. Also, the context menu 112 includes second level options, including, an option 120 to extend the text box 110 (i.e., the option "InputField"). The "TransparentContainer" options that are shown may include options for modifying a group of controls. For example, "Transparent Container" may refer to a parent container control which contains the text box 110 and selecting the "TransparentContainer" may lead to a customization of a group of controls including the text box 110.

Were the option 120 to extend the telephone text box 110 selected, a series of dialogue boxes may appear to assist a user in extending the telephone text box 110. The series of dialogue boxes may be referred to as a "wizard." FIG. 1B includes one of a series of dialogue boxes that may be used to assist a user in extending the telephone text box 110. The select component dialogue box 122 may assist a user in selecting from a list of components that may be used as modifications to the graphical user interface 102 of the client application.

Figure 1C:
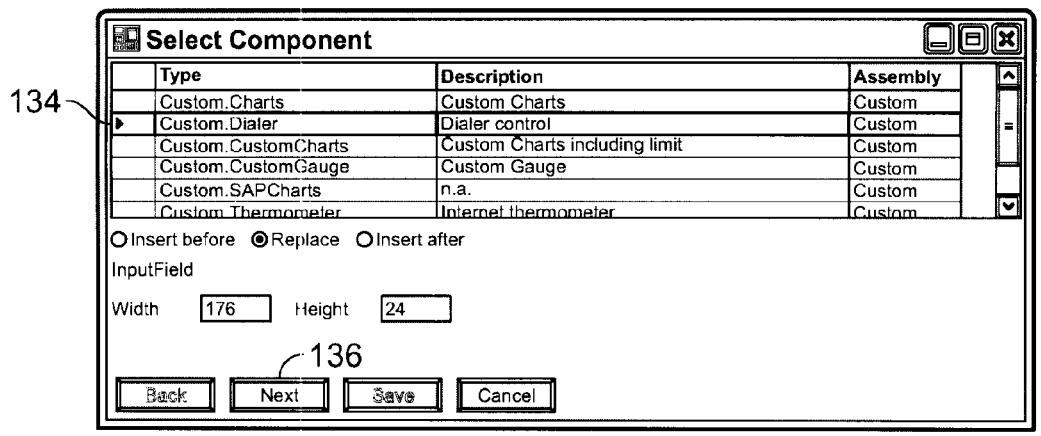

A list of components is shown in the window pane 124 of the select component dialogue box 122. The window pane 124 includes a column (the type column 126) with a name of a type of control that may be used to extend the text box 110 and a column (the description column 128) with a description of controls. In the window pane 124 a user may select a control with a mouse by clicking on a control in the list of controls. As shown in FIG. 1C, a control "Custom Dialer" is selected. Once selected, a following dialogue box that assists a user in personalizing the selected control may appear in response to a mouse click of a "next" button 136.

Figure 1D:
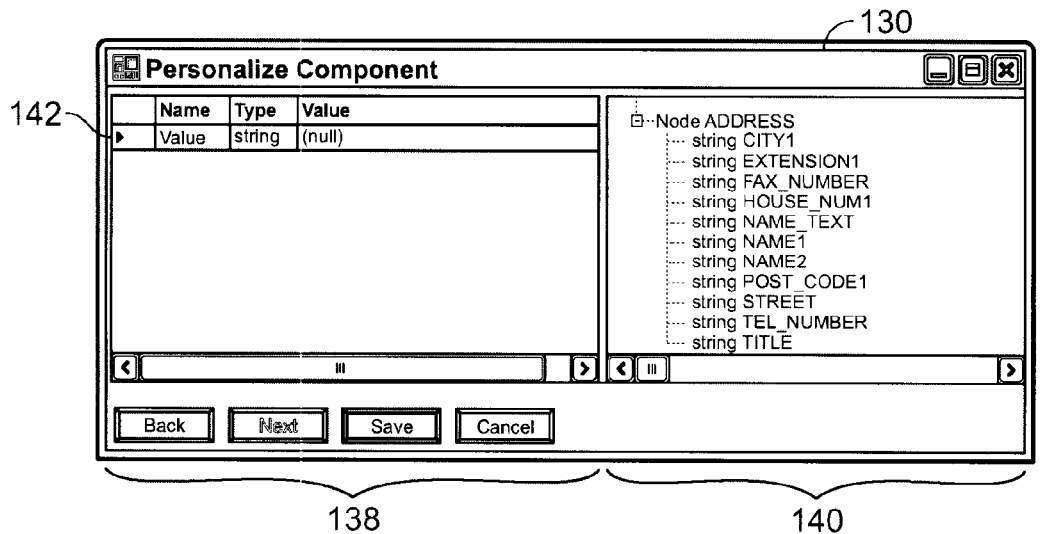

FIG. 1D shows a dialogue box 130 to assist a user in personalizing a selected control. In particular, the dialogue box 130 assists a user in binding data of a selected control to data of a client application (e.g., binding data that are inputs, outputs, or both of a selected control to outputs, inputs, or both of a client application; e.g., binding properties of controls to context data of a client application). The dialog box includes a first window pane 138 for selecting data of a selected control (e.g., a property of a control) and a second window pane 140 for selecting data of a client application (e.g., selecting context data of the client application). As shown in the second window pane 140, data of a client application may be selected in accordance with a tree-structured diagram of data of the client application. In FIG. 1D, the first window pane 138 includes a control property 142 that is not bound to any data of a client application.

Figure 1E:
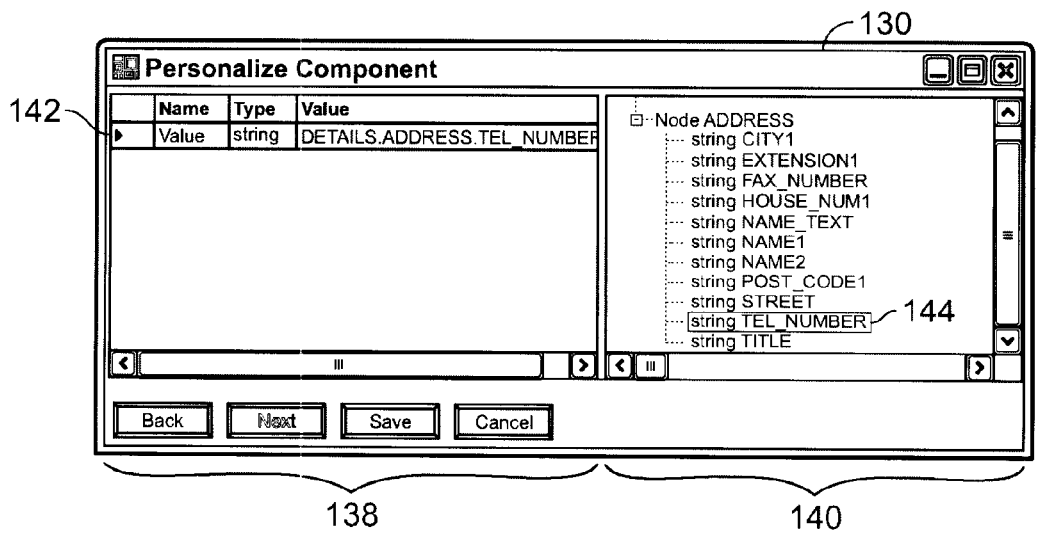

FIG. 1E depicts the result of context data of a client application being selected. In particular, a selected binding is depicted in the first window pane 138 by a value "DETAILS.ADDRESS.TEL_NUMBER" being displayed as being associated with the control property 142 of the selected control. The selected binding is of the control property 142 of the selected control to the selected context data 144 of the client application. The selection may be in response to mouse-driven user-generated input of a click on the selected context data 144 of the client application. In implementations, an automatic binding of components may occur without a user selection of a binding. For example, a default binding may exist. For example, interfaces for replacement controls may be predefined by the original controls. For example, the text box 110 may require an interface for accessing (e.g., by reading and writing) content values. Controls for a replacement may implement this interface to provide a default binding. In some variations, implementing the interface may be required and checking that interfaces are implemented may be performed as a measure to assist in determining whether a control is a suitable replacement.

Figure 1F:
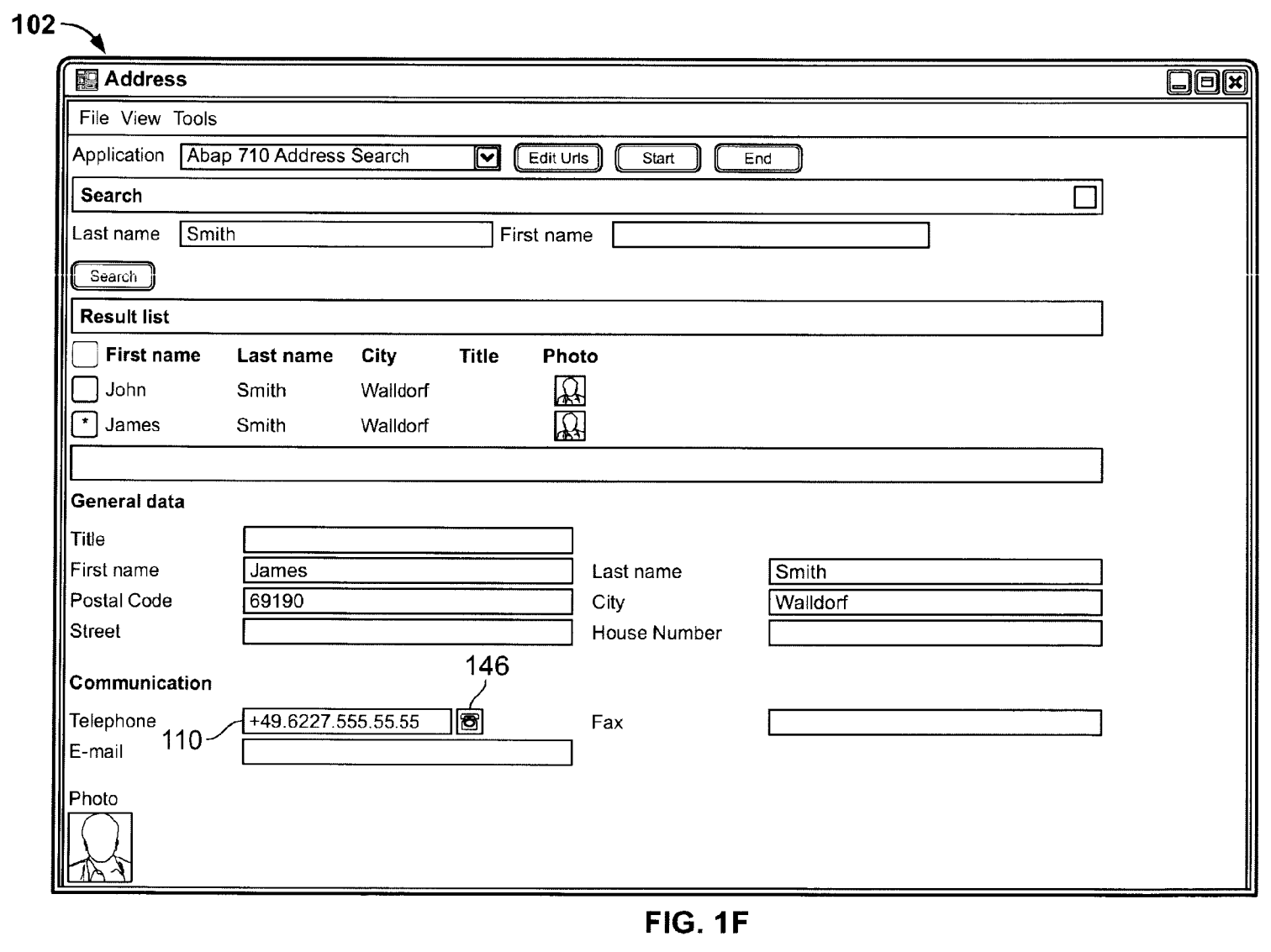

The graphical user interface 102 may be updated to reflect a modification of a control, as depicted in FIG. 1F. In particular, the graphical user interface 102 as depicted in FIG. 1F has a telephone dialer button 146, which may be added as a result of user interactions with the dialogue boxes depicted in FIGS. 1B-1E. The telephone dialer button 146 may be considered an extension of the telephone text box 110 or of the telephone user interface components 106 (e.g., different groups of components may exist and the telephone dialer button 146 may be a modification, such as a change or addition, of any of the groups of components).

Figure 1G:
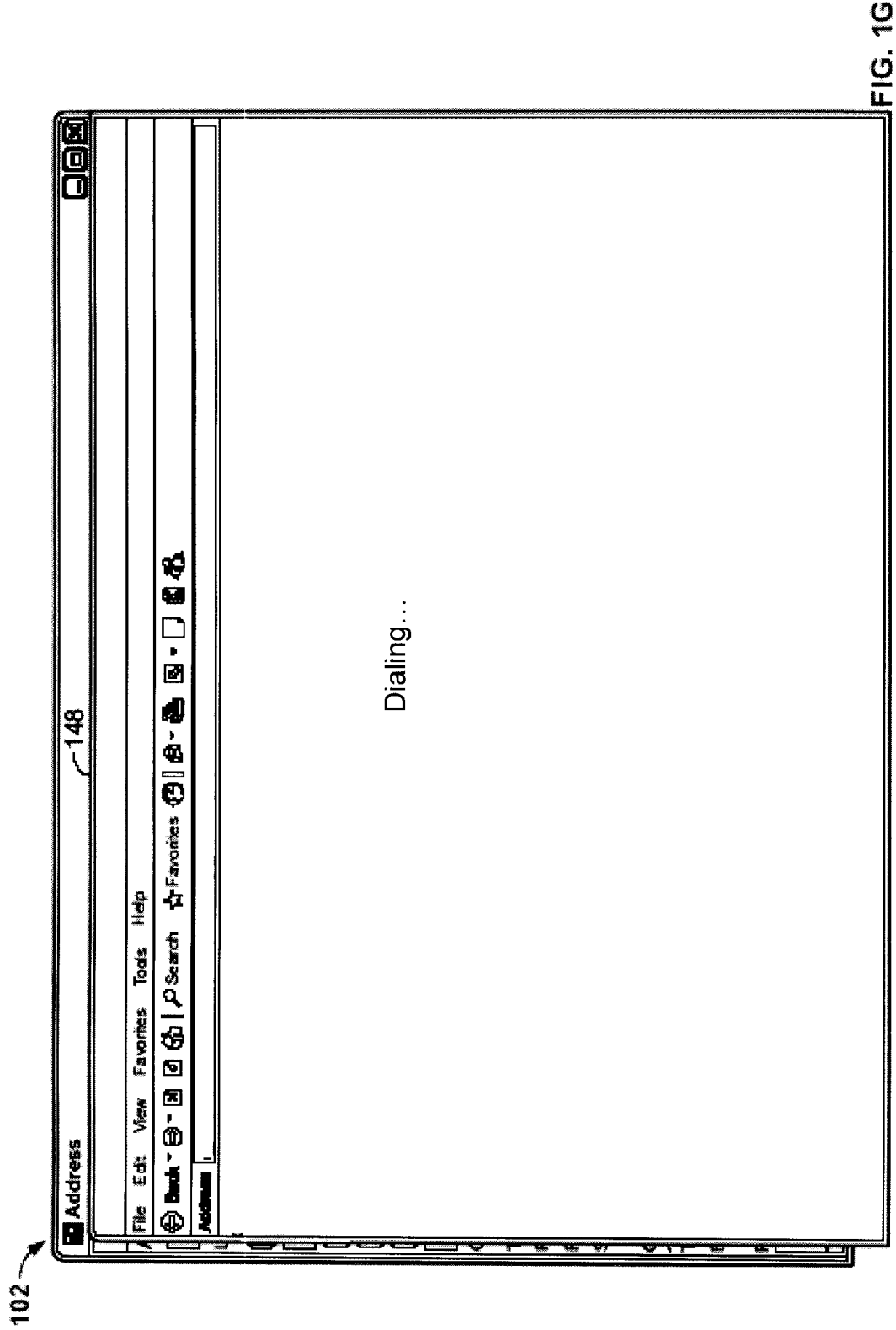

The telephone dialer button 146 may provide additional functionality that allows a user to automatically dial a phone number in the telephone text box 110. FIG. 1G includes the graphical user interface 102 (in the background) and a dialer window pane 148, that may dial the phone number in the telephone text box 110 of FIG. 1F in response to a user clicking on the telephone dialer button 146 of FIG. 1F. The services offered through dialer window pane 148 may be provided by the same server system that provides the services through the graphical user interface 102, or, the services of the dialer window pane 148 may be provided by a different server system. In some implementations functionality that is added to a graphical user interface may be part of the client application that includes the graphical user interface that is modified. For example, a component of the client application that includes the graphical user interface 102 may include functionality that dials a telephone number from the graphical user interface 102.

Figure 2A:
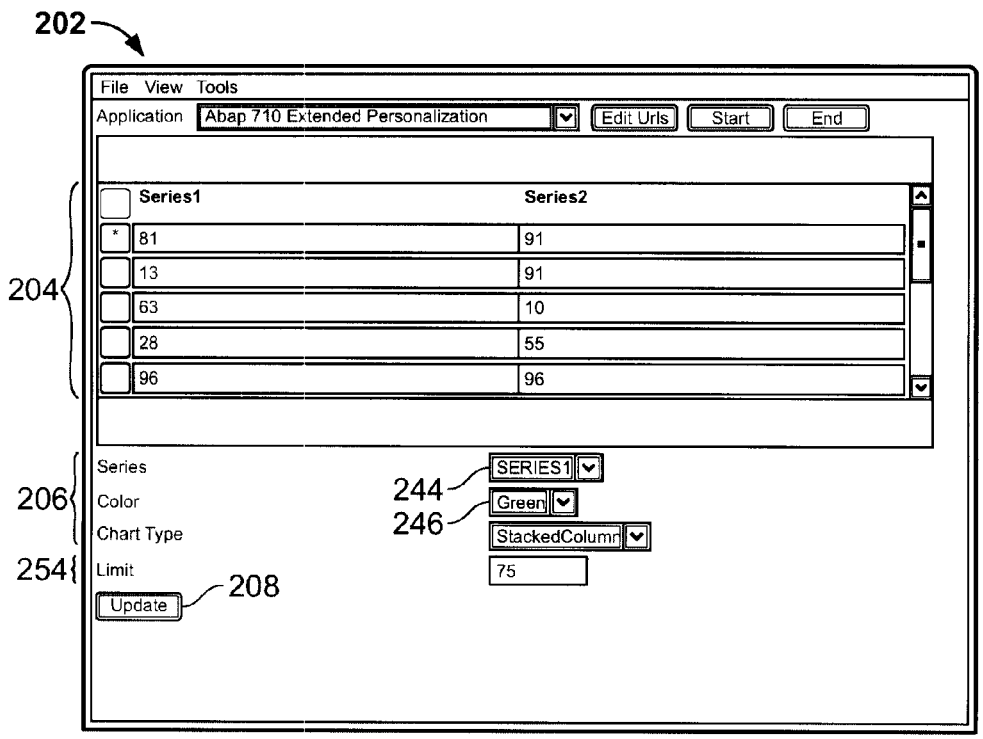
FIGS. 2A-2P include a series of example displays of a process of modifying a graphical user interface of a client application to include different user interface controls.
Figure 2B:
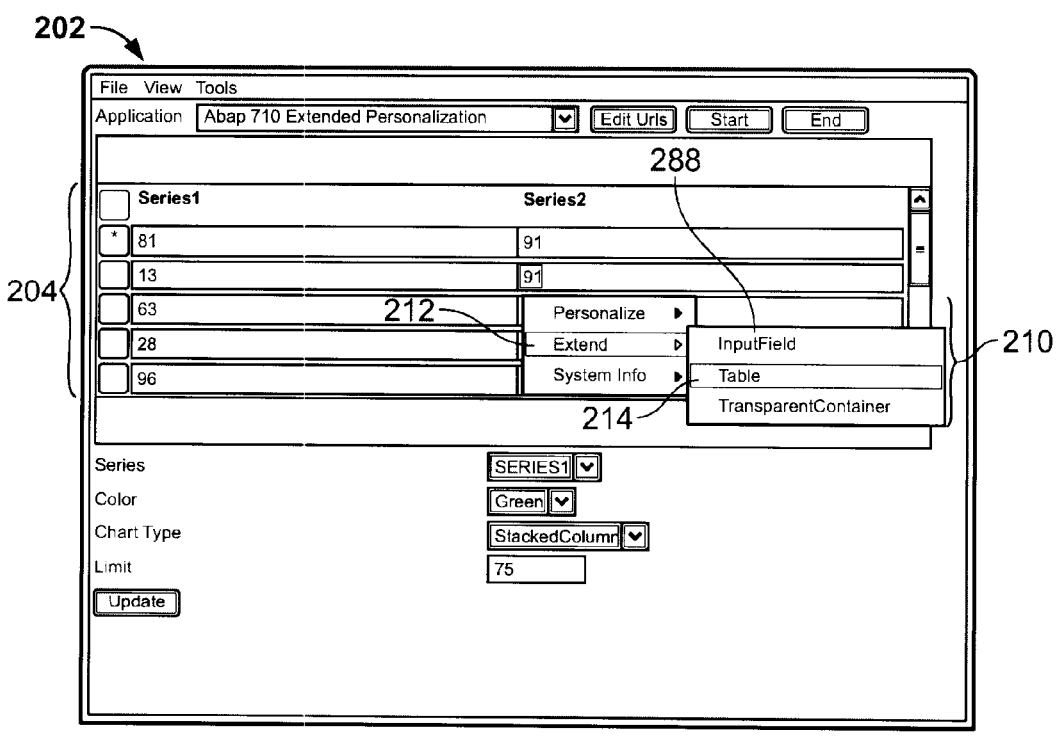
Figure 2C:
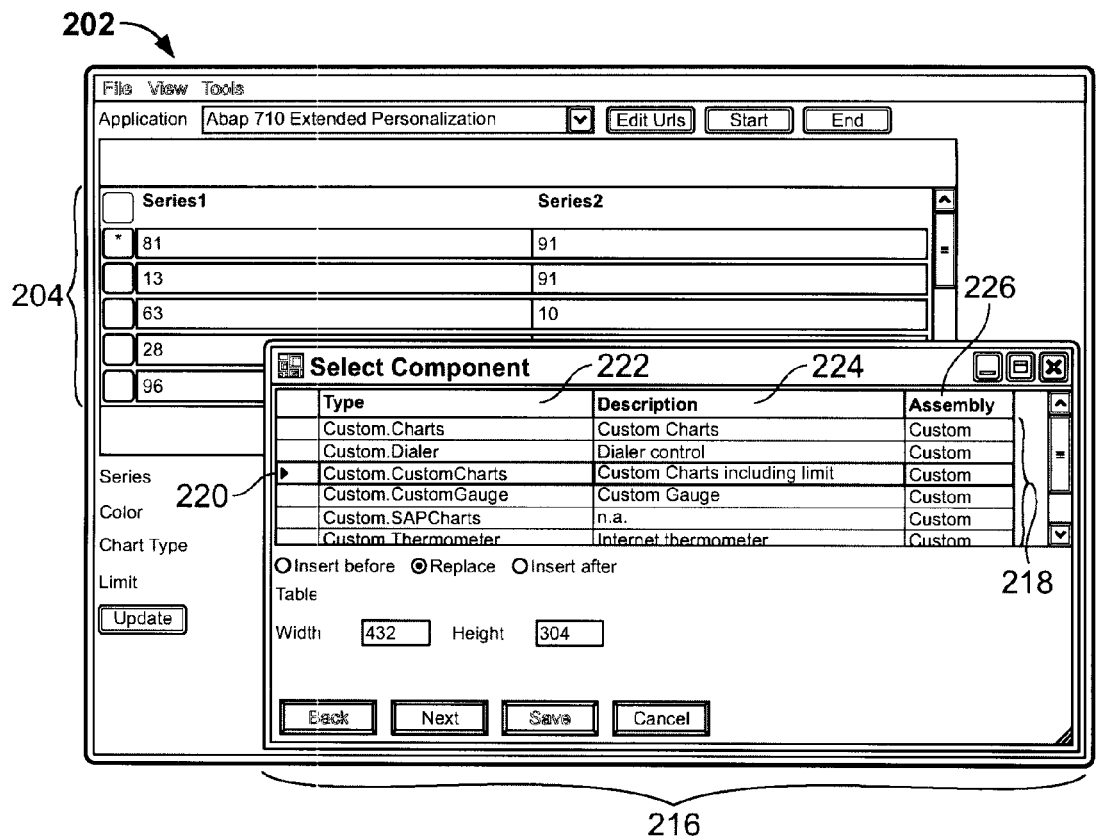
Figure 2D:
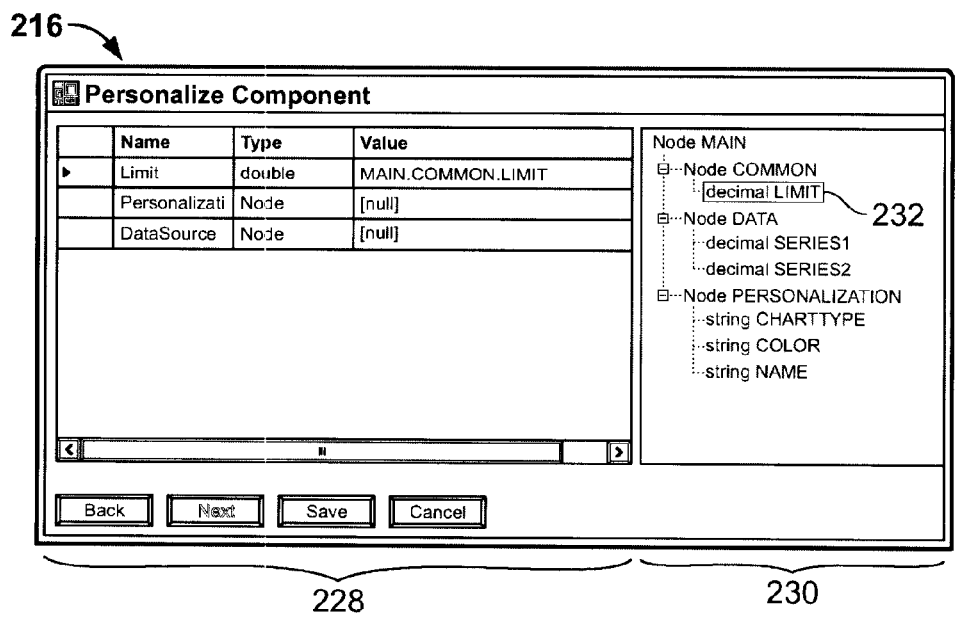
Figure 2E:
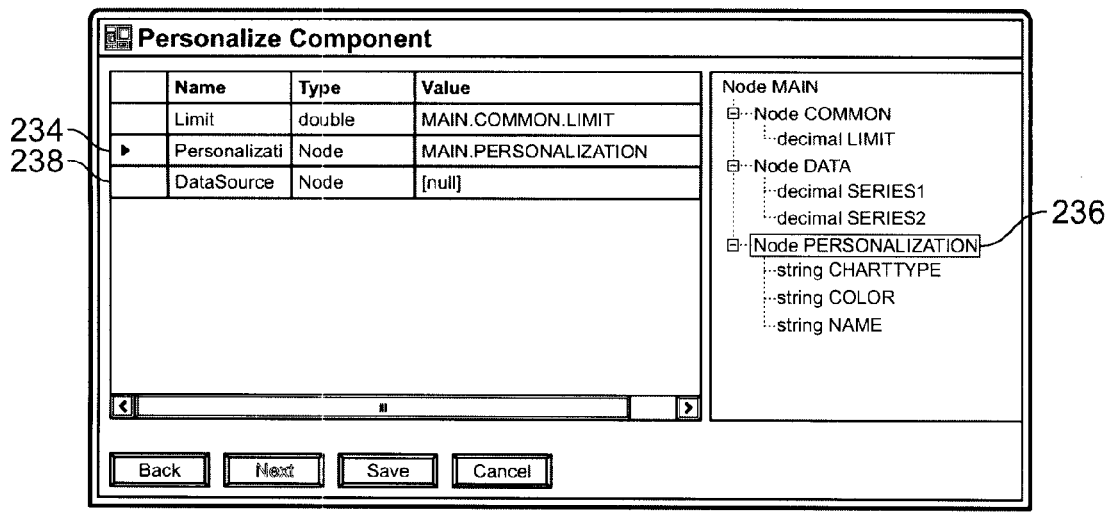
Figure 2F:
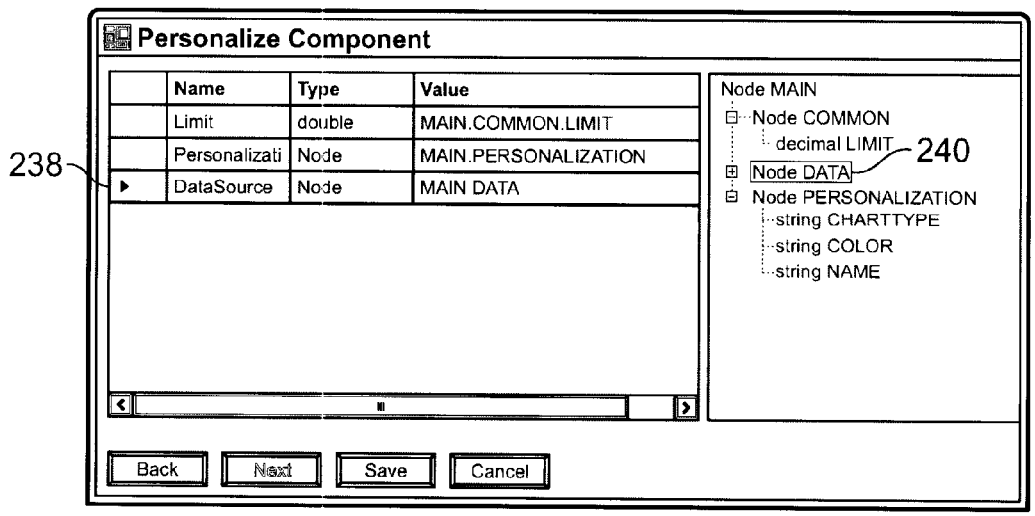
Figure 2G:
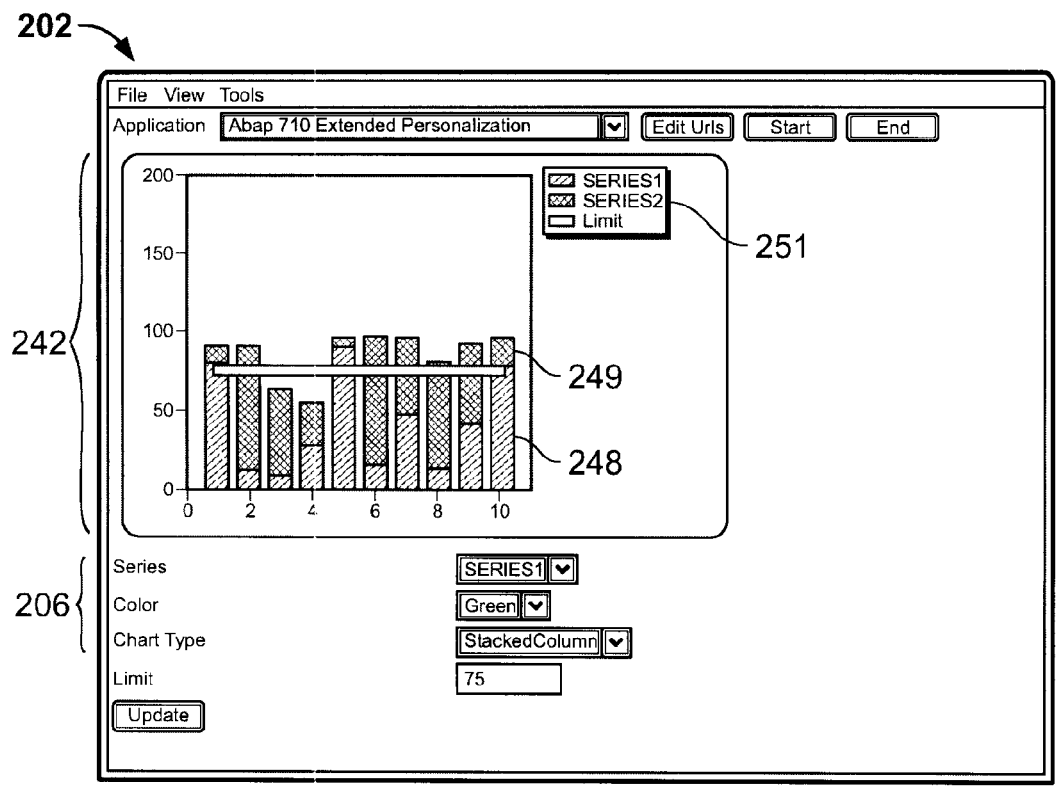
Figure 2H:
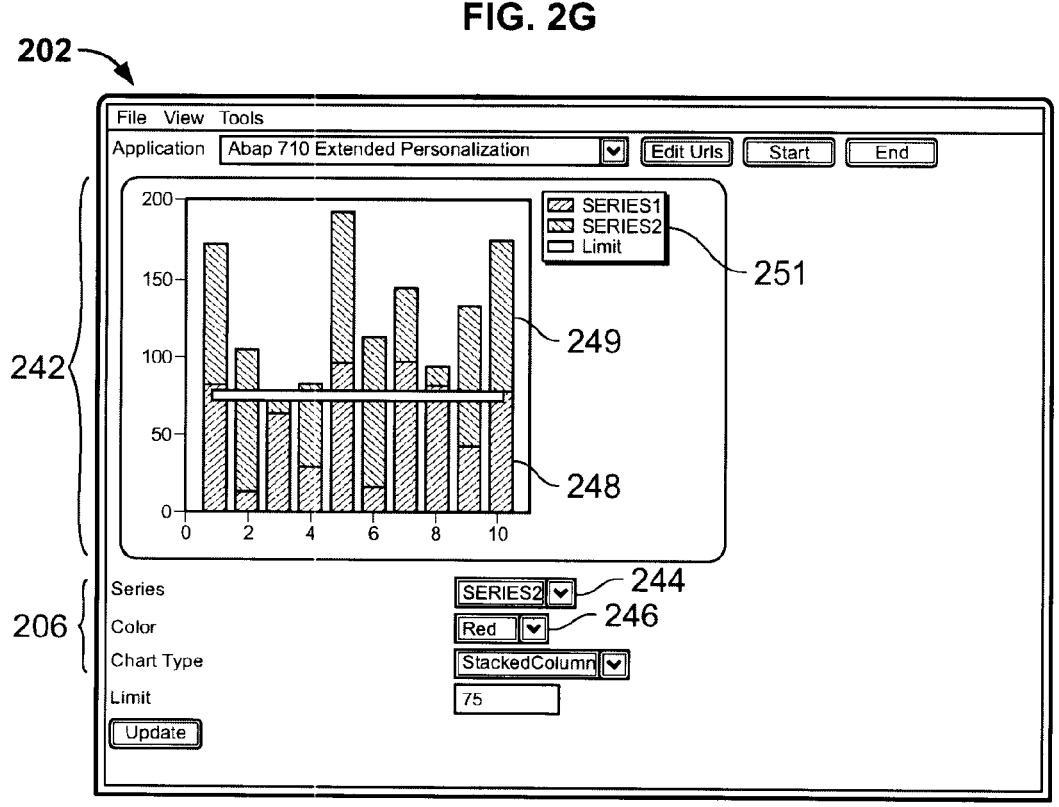
Figure 2I:
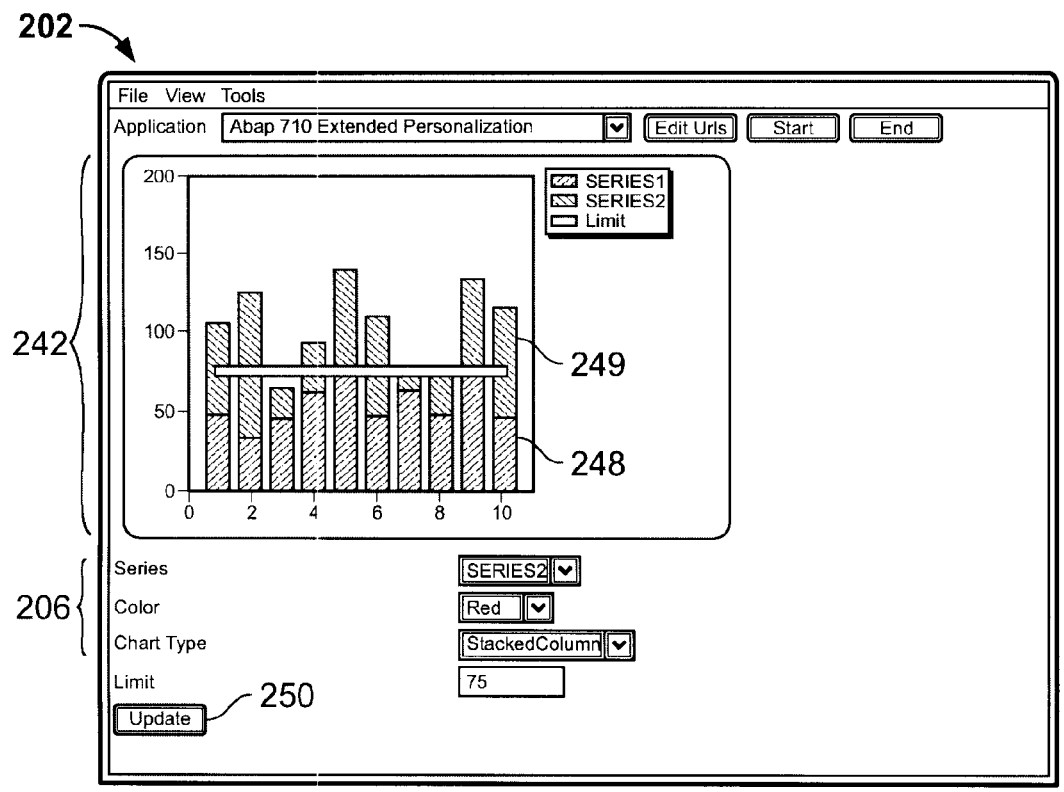
Figure 2J:
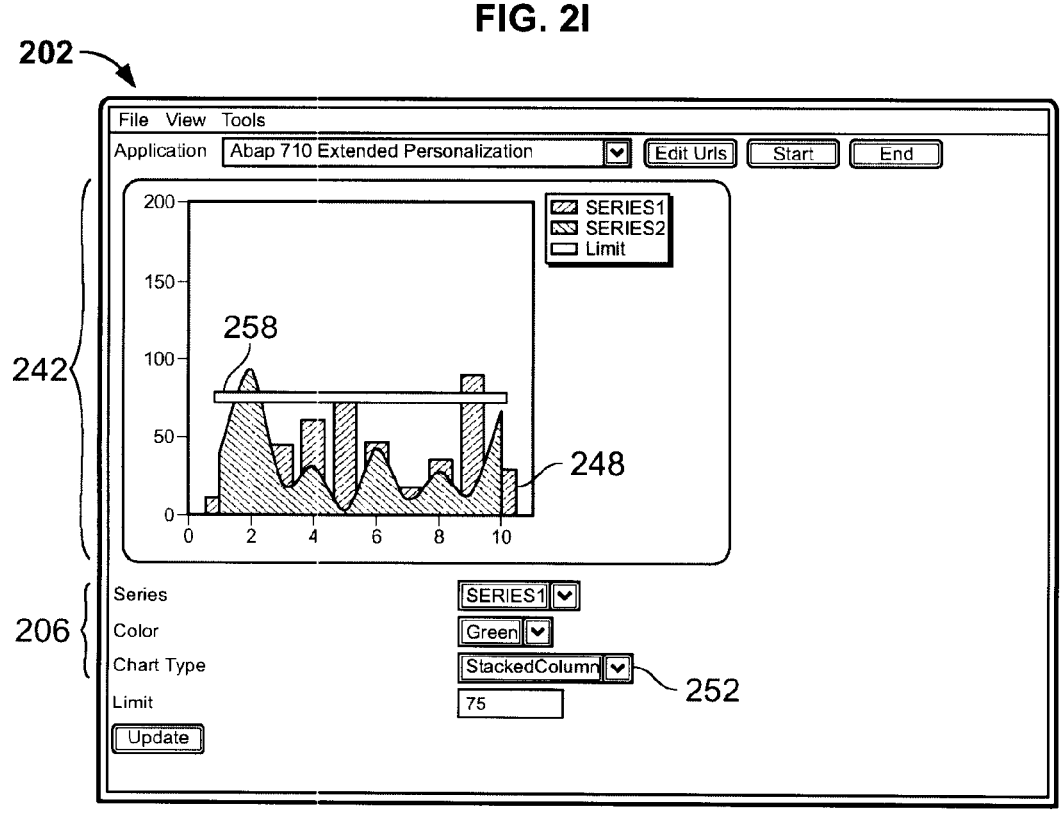
Figure 2K:
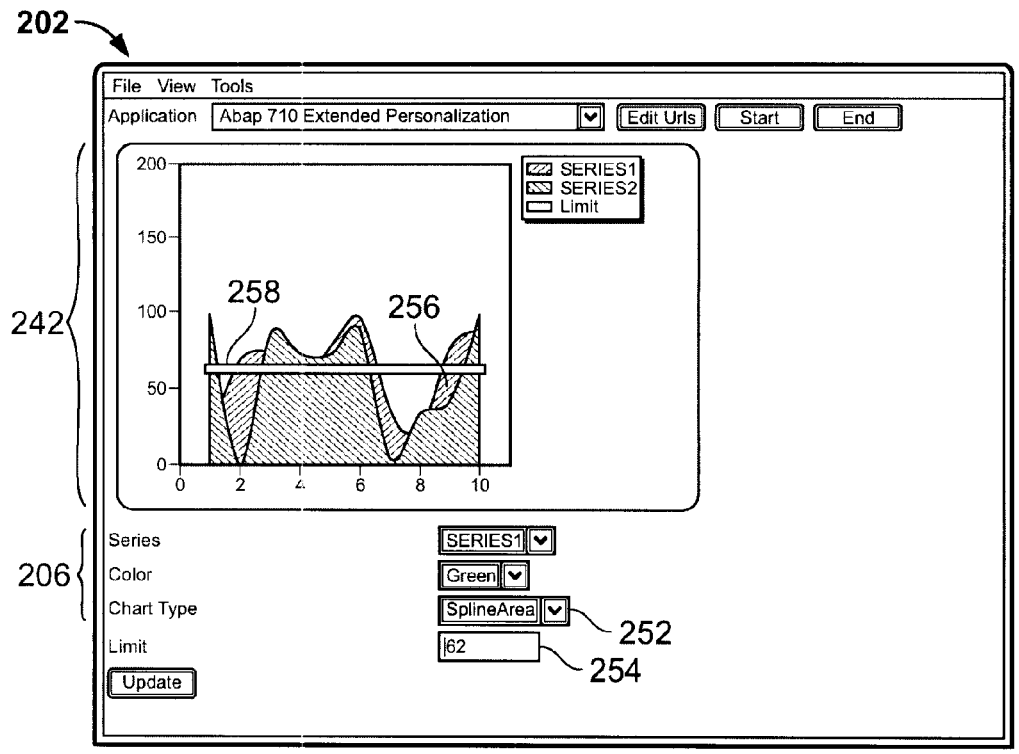
Figure 2L:
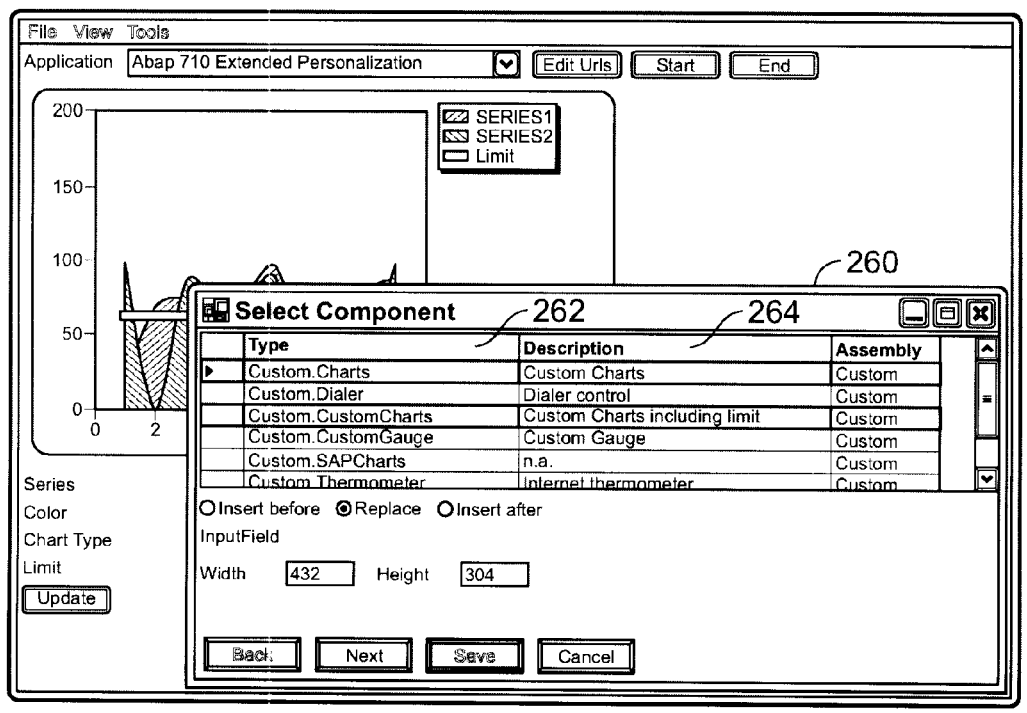
Figure 2M:
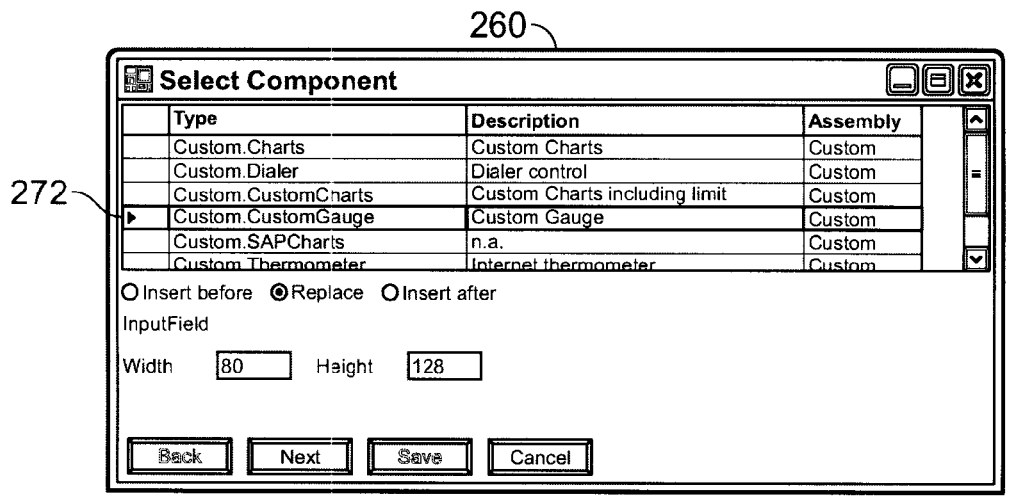
Figure 2N:
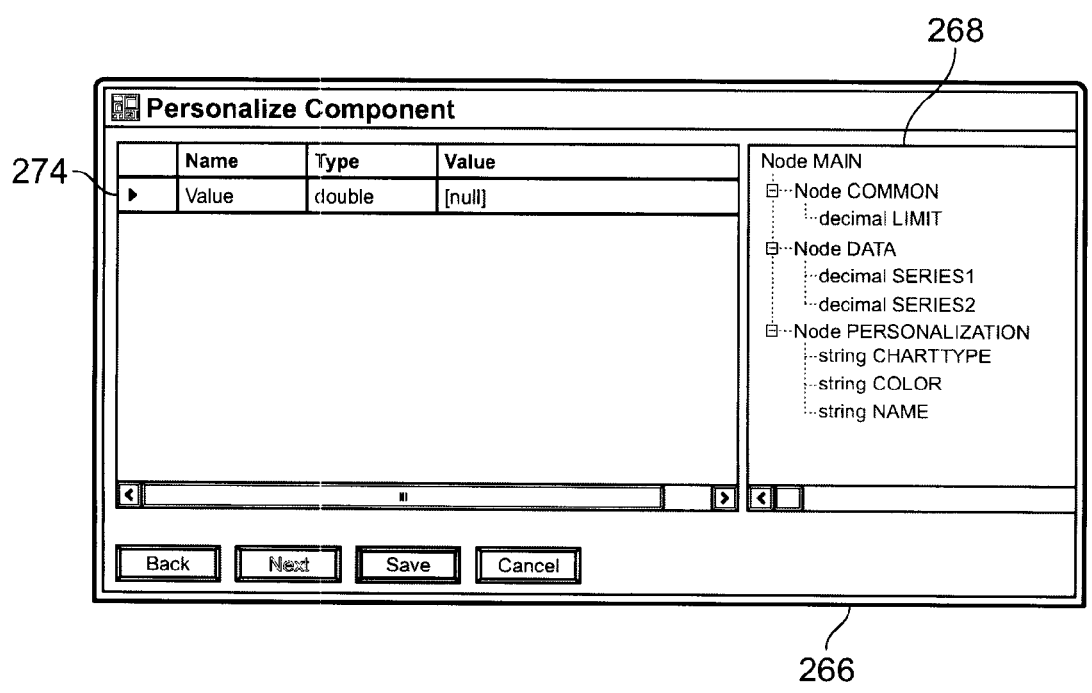
Figure 2O:
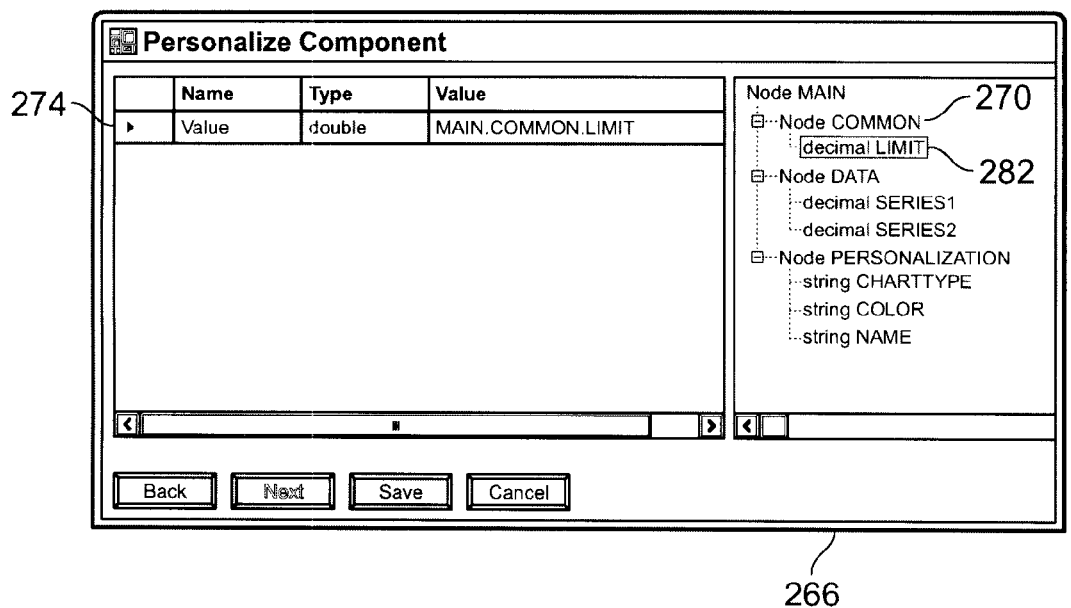
Figure 2P:
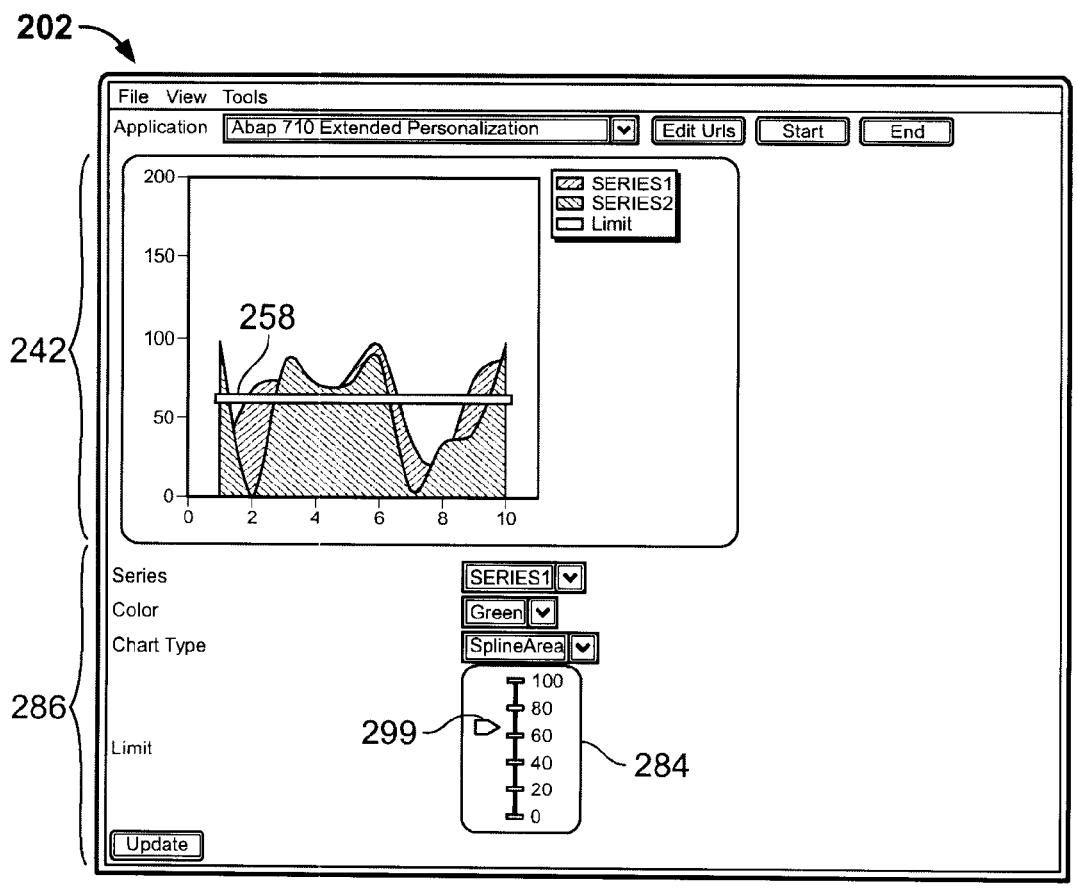

FIGS. 2A-2P include a series of example displays of a process of modifying a graphical user interface of a client application to include different user interface controls. FIG. 2A includes a graphical user interface 202 that has table controls 204, a series of pull-down menus 206, a "Limit" text box 254, and an "Update" button 208. The table controls 204 may display a series of data that are provided to the client application from a server system. The data in the table controls 204 may update in response to a user clicking on the "Update" button 208. A user may edit data in the table controls 204 by clicking on one of the cells in the table controls 204 and entering a value. Such an update may be reflected at a server system that provides services to client applications.

A user may interact with the series of pull-down menus 206 by clicking on a pull-down menu and selecting an item from a list of items. In FIG. 2A, due to the nature of the table controls 204 and the pull-down menus 206, interaction with the pull-down menus 206 does not affect the table controls. For example, a first pull-down menu 244 allows selection of a series of data and a second pull-down menu 246 allows for the color of a display of the data to change. However, because the table controls 204 do not have information that is displayed that changes in response to a change of a color associated with a series of data, changes in selection in the pull-down menus 206 does not affect the display of the table controls 204. In variations, the pull-down menus 206 may affect a display of data in the table controls 204 (as will be shown by an example, below).

In FIG. 2B, a context menu 210 for the table controls 204 is displayed. The context menu may be displayed in response to user interaction with the graphical user interface 202, and, more particularly, in response to user interaction with the table controls 204. A user may interact with the context menu 210 such that cascading menus may be displayed. In FIG. 2B, the context menu 210 is cascaded to show a selection of a menu item "table" 214 from the menu item "extend" 212. The menu item "extend" 212 allows a user to modify (e.g., add, remove, or delete) user interface controls from the portion of the graphical user interface 202 from which the context menu 210 is caused to be displayed. As the context menu 210 is displayed from the context of the table controls 204, the context menu 210 includes a list of extensions that may be made to the table controls 204. The list of extensions in FIG. 2B includes user interface components in a list that reflects a control hierarchy (e.g., InputField, Table and Transparent-Container reflect a control hierarchy of an input field within the Table 214 that is within a transparent container). By selecting a control in the hierarchy, a user may select a control in the context of a click being within the hierarchy. For example, the Table 214 is selected; however, a selection of the "InputField" 288 may allow a user to extend/modify input fields within the column of input fields where a user clicked.

FIGS. 2C-2F include a series of displays of dialogue boxes that may assist a user in modifying the table controls 204 of the graphical user interface 202. In particular, the series of displays show user-interaction that results in the table controls 204 of the graphical user interface 202 being replaced with a chart user interface.

FIG. 2C include a display of a dialogue box 216 for selecting a component to modify the table controls 204. In the dialogue box 216, multiple columns, including a type column 222 and a description column 224 may be used to identify a user interface component that may be used as a modification to the graphical user interface 202 (e.g., as a replacement of the table controls 204 or an addition to the table controls 204). A type listed in the type column 222 may refer to a type of user interface component and a description listed in the description column 224 may be a plain language description of the corresponding type of user interface component. For example, in FIG. 2C, a selected list item 220 has a type Custom.CustomCharts and a corresponding description "Custom Charts including limit."

In the dialogue box 216, a user selection of the selected list item 220 and a click of the button "Next" may cause a personalization dialogue box 226 of FIG. 2D to be displayed. The personalization dialogue box 226 includes a user interface from which a user may interact to map data of a selected user interface component (e.g., a property of a user interface component) to data of a client application (e.g., context data of the client application). For example, the personalization dialogue box 226 includes a first window pane 228 from which data of a user interface component may be selected, and a second window pane 230 from which data of a client application may be selected. A binding may be selected in response to user input that selects context data of the client application while a property of a user interface component is selected. For example, while the limit property 290 of the user interface component is selected, user interaction that selects the LIMIT context data 232 of the client application may cause a binding of the data to be selected. The selection of a binding is displayed in the first window pane 228 under the "Value" column 292. As another example, in FIG. 2D, a "Personalization" property 234 has a "null" value 294 indicating the property is not bound; and, in FIG. 2E the "Personalization" property 234 has a value MAIN.PERSONALIZATION 296 reflecting a selection of a binding to "PERSONALIZATION" context data of the client application. This binding may have occurred in response to user input selecting the Personalization node 236 of the second window pane 230.

As another example, in FIG. 2E, the DataSource data 238 does not have a binding to context data of the client application, as indicated by the value "null"; however, in FIG. 2F, the DataSource property 238 has a binding to the "DATA" context data (e.g., based on the Data node 240) of the client application as indicated by the value "MAIN.DATA."

FIG. 2G includes the graphical user interface 202 with a bar chart area 242 in lieu of the table controls 204 of FIG. 2A. The bar chart area 242 includes the first and second series of data, and a limit bar. The first and second series of data may be sent to the client application of graphical user interface 202 from a server program. Although the bar chart area 242 has replaced the table controls 204 of FIG. 2A, the series of pull-down menus 206 and the "Limit" text box 254 are still part of the graphical user interface 202. Consequently, through a process of using the dialogue boxes of FIGS. 2C-2F, a modification of a component of the graphical user interface 202 affected only one component without affecting other components. By replacing individual components of a user interface or groups of components, on a basis that does not affect an entire user interface, a heightened degree of customization of a configuration of a user interface may be achieved (e.g., a user may have more flexibility in selecting a combination of graphical user interface components that make up the graphical user interface).

FIGS. 2G-2K show how interaction in one component of a user interface may affect a display of another user interface component that has been customized. As user interface controls may be bound to data of a client application, values of data of a client application may be affected by changes to a user interface control. The change of data values may be reflected in other user interface controls that are bound to data of the client application. Thus, the changes to user interface components shown in FIGS. 2G-2K may be a reflection of changes to data of the client application corresponding to the graphical user interface 202.

FIGS. 2G-2H show how a selection of values in pull-down menus 206 may affect the display of the chart area 242. In FIG. 2G a first and second series of data are displayed in the chart area 242 as two different shaded areas (a first bar 248 and a second bar 249), as indicated by the legend 251. In FIG. 2H, through a selection of a combination of values "SERIES2" and "Red" in the series and color pull-down menus 244, 246, respectively, the display of the second bar 249 has changed. Similarly, the legend 251 has changed to indicate the change in the display of the second bar 249. FIGS. 2H-2I show an update of the display of the chart area 242 by updated data received from a server as indicated by a change in the size of the first and second bars 248, 249 (such an update may have been triggered by a selection of the update button 250). Thus, data received from a server may affect the display of data in a component that is customized (e.g., the change of data in the chart area 242 may have changed due to a change in data received from a server).

FIGS. 2J-2K show further changes to the chart area 242 that may be caused by changes in the selection of values of data controlled by other user interface controls in the graphical user interface 202. For example, the chart type pull-down menu 252 may be used to change a value of a chart type context data of the client application from a stacked column type graph to a spline-area graph, as indicated in the change of the display of a first series of data from the first bar 248 of FIG. 2J to the first spline area 256 of FIG. 2K.

As another example, a new value entered in the "Limit" text box 254 may cause the limit bar 258 to change to a different level, as indicated by the change of the limit bar 258 between 2J and 2K, and the change of the value in the "Limit" text box 254 from 75 to 62.

FIGS. 2L-2P show how other components of the graphical user interface 202 of FIG. 2K may be further modified to have a different combination of user interface components. The result of the modification, as shown in FIG. 2P, is that a user interface control is replaced and the new user interface control, which has a same binding to context data as the user interface control replaced, may be used to manipulate that data.

FIG. 2L includes a first dialogue box 260 that may be used to choose a user interface component to replace the "Limit" text box 256. Similar to the dialogue box 216 used with regard to the discussion of dialogue boxes used to replace the table controls 204 with the chart area 242, the first dialogue box 260 includes a type column 262 and a description column 264 that may be used to identify a user interface component that may be used as a modification to the graphical user interface 202. FIG. 2M shows a selection of a Custom.Custom.Gauge 272 user interface component.

FIG. 2N includes a dialogue box 266 that may be used to map data of the Custom.Custom.Gauge 272 that was selected in FIG. 2M to data of the client application (the context data of the client application is shown in the explorer window pane 268). In FIG. 2N, property "Value" 274 is not bound as indicated by the value "null." FIG. 2O reflects that a selection of a binding was made in the first window pane 268, as indicated by the value "MAIN.COMMON.LIMIT" for the property "Value" 274, which indicates a binding to the context data "LIMIT" 282 of the node "COMMON" 270 of the client application.

FIG. 2P includes the graphical user interface 202 with a gauge control 284 in lieu of the Limit text box 254 of, for example FIG. 2K. A binding of data of the gauge control 284 to data of the client application having the graphical user interface 202 may be in accordance with a selection of binding in FIG. 2O. For example, the context data "MAIN.COMMON.LIMIT" may be bound to the gauge control 254 such that interactions with the gauge control are relayed to the context data and cause application components to have behavior reflecting interaction with the gauge control 284. For example, a user may move the arrow 299 of the gauge control 284, which may, in turn, cause a change to a value of the context data bound to the gauge control. The change of that value may cause the limit bar 258 to change to a different level. Similarly, interaction with other components in the graphical user interface 202 may cause changes to the gauge control 284. For example, a user may click and drag the limit bar 258, which may in turn cause the gauge control 284 to change to reflect a position of the limit bar 258.

Although dialogue boxes of FIGS. 2C-2F show a binding of all properties of a control to context data of a client application, in variations all data need not be bound for a user interface to be modified and function properly. Although all data that are bound are discussed with relation to input, output, or both of a client application, data that are bound need not be related to input, output, or both of a client application. For example, a property may be used to receive input from a user and need not be bound to provide output to a client application.

Figure 3:
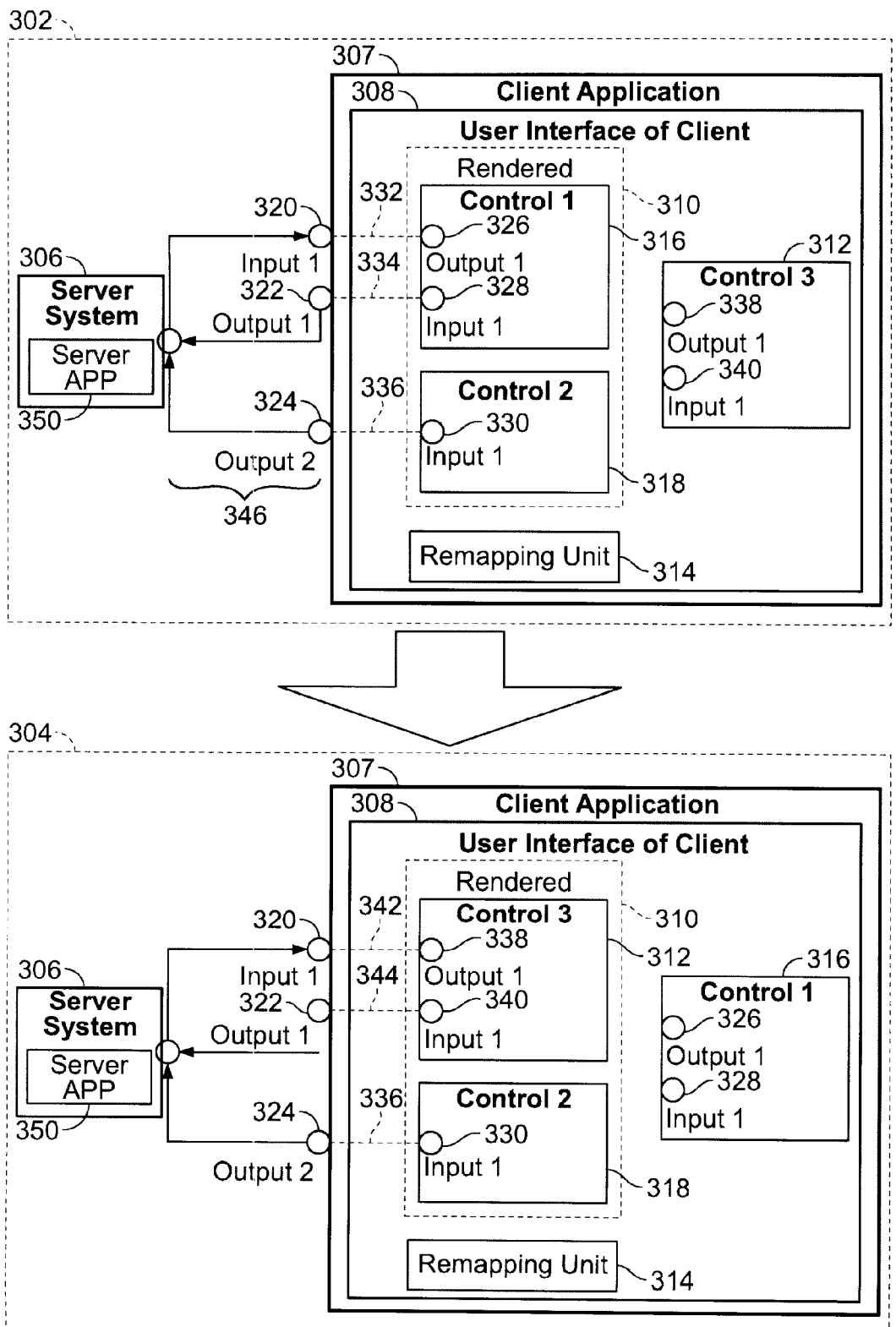
FIG. 3 includes diagrams of an example system with different user interface controls for a graphical user interface of a client application.

FIG. 3 includes diagrams 302, 304 of an example system with different user interface controls for a graphical user interface 308 of a client application 307. The first and second diagrams 302, 304 may reflect a first and second state of the system, respectively. The system includes a server system 306, which may send and receive data to and from a user interface 308 of a client application 307, as depicted by the arrows 346 that are between inputs and outputs of the client application 307 and the server system 306. The server system includes a server application 350 (e.g., a server program) that manages, performs, or both operations of the server system to provide a service. The user interface 308 of the client includes three user controls, control 1 (316), control 2 (318), and control 3 (312), and a rebinding unit 314. Although different controls are part of the user interface, not all controls may be rendered, as indicated by the box 310 indicating the controls which are rendered. For example, in the first diagram 302 the control 1 (316) and control 2 (318) are shown in the box 310, indicating that they are rendered, whereas, in the second diagram 304, the control 3 (312) and the control 2 (318) are included in the box 310.

Controls of the user interface 308 are bound to inputs and outputs of the client application 307, as reflected by bindings (334, 334, 336, 342, 344). For example, in the first diagram 304, there is a first binding 332 from an output 1 (326) of the control 1 (316) to the input 1 (320) of the client application 307. A binding may allow for input, output, or both of the client application 307 to be associated with output, input, or both of the controls. For example, a binding may allow for output of the server system 306 that is received by the input 1 (320) of the client application 307 to be relayed to the output 1 (326) of the control 1 (316). For example, the client application 307 may store a table of bindings of properties of user interface components (e.g., properties that are used for input, output, and both) to context data of the client application 307, and, received input may be bound to properties of the user interface components based on the table of bindings.

As a binding may allow for input, output, or both of the client application 307 to be associated with output, input, or both of a user interface component, a binding of properties of input, output, or both of a user interface component (e.g., a user interface control) to the client application 307 may effectively constitute a binding of input, output, or both of the user interface component to the output, input, or both client application 307. For example, were the client application 307 to allow for selection of binding as in FIGS. 2A-2P, where context data of a data model of the client application is bound to a property of a user interface component, a binding of context data of the data model of the client application to a property of a user interface component may effectively be binding of input of the client application to output of a user interface component.

To assist in binding the client application to components of the user interface 308, the user interface 308 includes a rebinding unit 314. The rebinding unit 314 may cause a series of dialogue boxes to be displayed to assist a user in selecting a binding. For example, the rebinding unit 314 may cause the dialogue boxes of FIGS. 2C-2F to be displayed to assist in selecting a binding. The rebinding unit may also store bindings and assist the user interface 308 by actively binding input, output, or both of a user interface component to output, input, or both of the client application 307 (e.g., by actively relaying information that reflects changes to data).

The second diagram 304, in contrast to the first diagram 302, includes the control 3 (312) as part of the rendered controls instead of the control 1 (316). Also, the second diagram 304 includes bindings 342, 344 of output 1 (338) and input 1 (340) of the control 3 (312) to input 1 (320) and output 1 (322) of the client application 307, respectively instead of bindings 332, 334 of output 1 (326) and input 1 (328) of the control 1 (316) to input 1 (320) and output 1 (322) of the client application 307. However, the first and second diagrams both include a binding 336 of the input 1 of the control 2 to the output 2 (324) of the client application 307.

As the second diagram includes the control 3 (312) in place of the control 1 (316) (e.g., by virtue of the bindings 342, 344), and the control 2 (318) has remained the same, a component-by-component customization of controls (or other types of user interface components) is shown in FIG. 3.

Figure 4:
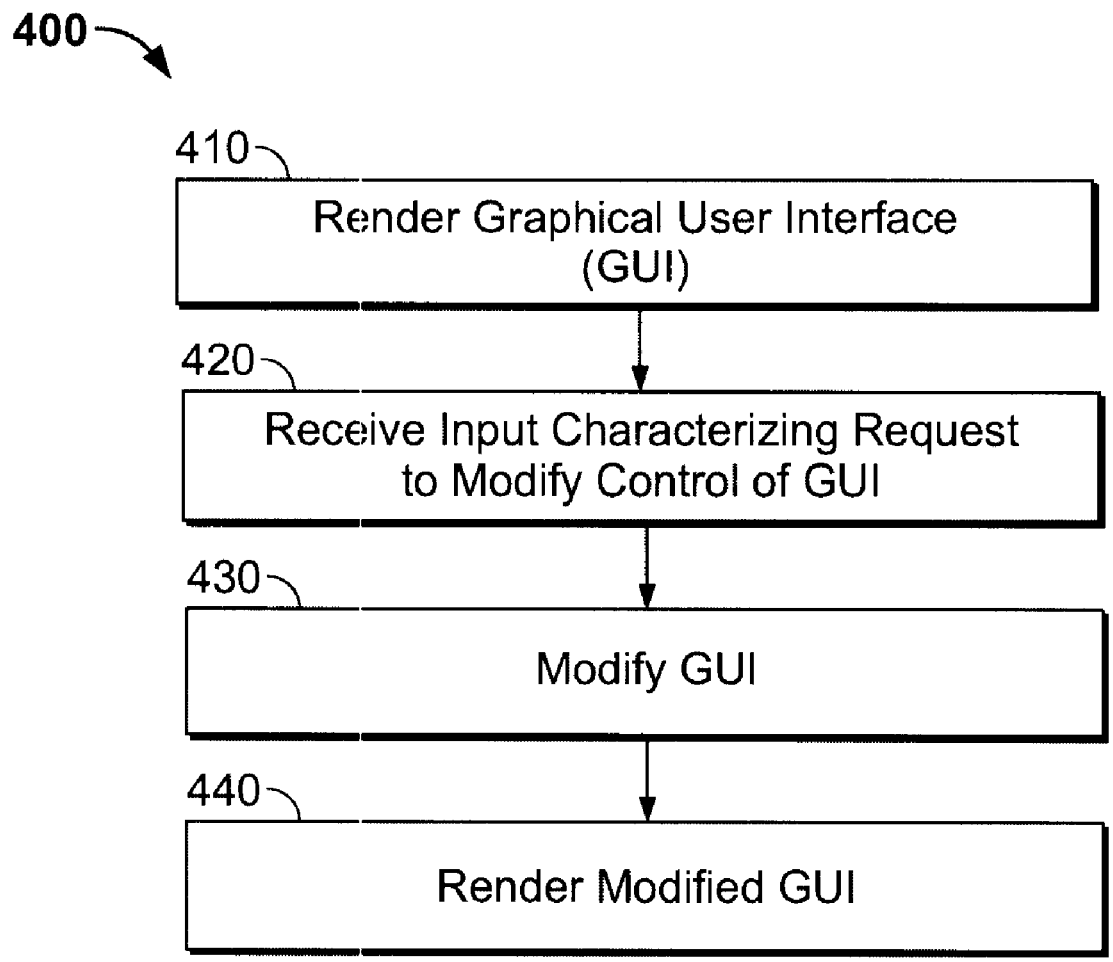
FIG. 4 is a flowchart of an example process of modifying user interface controls of a client application.

FIG. 4 is a flowchart 400 of an example process of modifying user interface controls of a client application. The client application described with reference to FIG. 4 may be the client application 307 of FIG. 3 or one of the client applications described with reference to FIG. 1A or 2A.

A graphical user interface of the client application is rendered at 410. The graphical user interface may be the graphical user interface 202 of FIG. 2A. For example, the graphical user interface may have first and second control, and those controls may be rendered. The client application may have the controls bound to input, output, or both of the client application such that information rendered in the controls may include information that is sent from a server, information provided to a server from a user, or both. For example, the client application may include one input and two outputs for services offered by a server computer program; the first control may be coupled to the client application such that an input of the first control is bound to a first one of the client application outputs and an output of the first control is bound to the client application input; and the second control may be coupled to the client application such that an input of the second control is bound to a second one of the client application outputs.

In that example, controls of the client application may be interrelated such that user-generated interaction with the second control causes a display of data at the first control to change. For example, user interaction with the limit gauge 284 of FIG. 2P may cause the limit bar 258 to change position.

As another example, user-generated interaction with the second control may cause a display of data at the first control to change where the data is received at the client application from a server computer program. For example, the chart type pull-down menu 252 may be used to change a value of a chart type context data of the client application from a stacked column type graph to a spline-area graph, as indicated in the change of the display of a first series of data from the first bar 248 of FIG. 2J to the first spline area 256 of FIG. 2K.

As another example, input characterizing user-generated interaction may be relayed to a server and the server may send data to the client application that is based on the input. For example, a stream of data sent to a client may change based on a selection of a different stream of data.

Input characterizing a request to modify a control of a graphical user interface is received at 420. The input may be received through a combination of a context menu of a client application, such as the context menu 112 of FIG. 1A, and a series of dialogue boxes, such as the dialogue boxes 122, 130 of FIGS. 1B-1E. For example, the input may include a request to modify a first control and a selection of a second control.

The second control may be selected as a replacement of the first control or an extension to the first control. In variations, a group of controls may be selected for modification (e.g., instead of a single control) and any number of controls may be selected to modify the group of controls (e.g., one or more controls may replace a group of controls).

The input may also include a selection of a binding of inputs, outputs, or both of a control to outputs, inputs, or both of the client application. For example, the dialogue box 266 includes a selection of a binding of a property 274 "Value" of a user interface control to context data 282 "MAIN.COMMON.LIMIT" of a client application that may be received as input through the dialogue box 266. In variations, default bindings may be used and a user may or might not have an opportunity to select a binding. For example, an automatic binding of components may occur without a user selection of a binding.

A graphical user interface is modified at 430. The graphical user interface that is modified may be the graphical user interface rendered at 410. Modifying the graphical user interface may include exchanging a first control that was requested to be modified with a second control that was selected as a replacement. The exchanging may include rebinding an input and one of two outputs of the client application such that an input and output of the first control become input and output of the second control, respectively. For example, between the first and second diagrams 302, 304 of FIG. 3, the control 1 (316) is exchanged with the control 3 (312) by binding the inputs and outputs of the control 3 (312) to the client application 307 and removing the binding of inputs and outputs of the control 1 (316) to the client application 307.

A modified graphical user interface is rendered at 440. Following the previous example, in contrast to the first diagram 302 of FIG. 3, the second diagram 304 includes the control 3 (312) as being rendered (as indicated by the box 310) instead of the control 1 (316).

Although the process depicted in the flow chart 400 includes a certain number of sub-processes, variations may include fewer, different, or additional sub-processes. For example, the process may further include receiving interaction with a non-modified component of the modified graphical user interface and rendering the modified component to reflect the interaction with the non-modified component.

As another example, once a series of one or more modifications of controls has been completed, a client application may be finalized such that further modifications are not possible. This may assist, for example, in the configuration and branding of client applications. In implementations, finalizing may occur by having different user profiles that allow for different access privileges to configuration files of a client application. For example, a user having an administrative role may be able to modify a configuration file for a client application and finalize those changes such that the configuration filed is used by users having an end-user role who can view but not edit a modified user interface that is generated based on the configuration files. As another example, finalizing may include having different versions of an application. For example, a first version may be modifiable and finalizing may include generating a copy of the application which restricts modification (e.g., by not including functionality to modify controls).

In implementations, a client application need not be dependent on a specific server application. For example, a generic browser may act like a client application which interacts with distinct server applications. Such a client application may be modified independently of the server application and the modifications may be reflected in any number or type of server applications with which a modified client interacts. For example, properties of a control may be bound to context data of the client application which is accessible on the client, but provided by the server application. Thus, data input to a first set of context data of a client application from a first server applications may be displayed with customized controls and data input to the same first set of context data of the client application from a second server application may also be displayed with the same customized controls, and the binding from properties of a control to context data of the client application need not change.

In implementations, controls of a stand-alone program (e.g., a program that does not interact with a server) may be modified. For example, an application that is distributed to users through download may be installed locally and the application may provide functionality to an end-user without interacting with a server. In those implementations, a user may be able to modify components of the user interface similar to the modifications performed in FIGS. 1A-1G, 2A-2P, and FIG. 3, and may use techniques similar to those discussed with relation to the flowchart of FIG. 4.

The subject matter disclosed in this specification may be implemented in digital electronic circuitry, or in computer software, firmware, or hardware, including the structural means disclosed in this specification and structural equivalents thereof, or in combinations of them. The subject matter may be implemented as one or more computer program products, i.e., one or more computer programs tangibly embodied in an information carrier, e.g., in a machine-readable storage device (i.e. non-transitory media) or in a propagated signal, for execution by, or to control the operation of, data processing apparatus, e.g., a programmable processor, a computer, or multiple computers. A computer program (also known as a program, software, software application, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file. A program may be stored in a portion of a file that holds other programs or data, in a single file dedicated to the program in question, or in multiple coordinated files (e.g., files that store one or more modules, subprograms, or portions of code). A computer program may be deployed to be executed on one computer or on multiple computers at one site or distributed across multiple sites and interconnected by a communication network.

The processes and logic flows described in this specification, including any methods, may be performed by one or more programmable processors executing one or more computer programs to perform functions by operating on input data and generating output. The processes and logic flows may also be performed by, and apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

The subject matter disclosed herein may be implemented in a computing system that includes a back-end component (e.g., a data server), a middleware component (e.g., an application server), or a front-end component (e.g., a client computer having a graphical user interface or a web browser through which a user may interact with an implementation), or any combination of such back-end, middleware, and front-end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other in a logical sense and typically interact through a communication network. The relationship of client and server arises by virtue of computer programs running on the respective computers and having a client-server relationship to each other.

Other implementations are within the scope of the following claims. For example, the process of the now chart 400 of FIG. 4 may differ and still achieve desirable results. In certain implementations, multitasking and parallel processing may be preferable. Other implementations are within the scope of the following claims

What is claimed is:

1. A computer program product, embodied in non-transitory media, the computer program product to cause data processing apparatus to perform operations comprising:
    rendering a graphical user interface of a client application, wherein:
    the graphical user interface comprises a first and second control, the client application comprises one input and at least two outputs for services offered by a server computer program,
    the first control is coupled to the client application such that an input of the first control is bound to a first one of the client application outputs and an output of the first control is bound to the client application input, the second control is coupled to the client application such that an input of the second control is bound to a second one of the client application outputs, and user-generated interaction with the second control causes a display of data at the first control to change, the data received at the client application from the server computer program;
    receiving user-generated input characterizing a request to modify the first control and a selection of a third control;

exchanging the first control with the third control by rebinding the one input and the first one of the two outputs of the client application such that the input and output of the first control become input and output of the third control, respectively;

rendering the graphical user interface of the client application as having the third control in lieu of the first control;

receiving user-generated input characterizing interaction with the second control; and rendering the third control to reflect the interaction with the second control, wherein the first control, the second control and the third control are components of the graphical user interface;

wherein there are different access privileges to modify a configuration file of the client application that specifies how to render the graphical user interface of the client application, wherein there are first users having a first access privilege that can modify a first configuration file and there are second users having a second access privilege different than the first access privilege that cannot modify the first configuration file.

2. The computer program product in accordance with claim 1, wherein the rendering the third control is in response to an interaction from the server computer program and the display of the third control comprises information from the server computer program.

3. The computer program product in accordance with claim 1, wherein the operations further comprise:

rendering a series of dialog boxes to assist a user to select and map the input and the first one of the outputs of the client application to the output and input of the third control, respectively.

4. The computer program product in accordance with claim 1, wherein the operations further comprise:

presenting a set of controls for selection by a user, the set of controls comprising the third control.

5. The computer program product in accordance with claim 4, wherein presenting the set comprises presenting controls having input being mappable to the output of the client application.

6. The computer program product in accordance with claim 1, wherein the rendering the graphical user interface as having the third control comprises displaying information from the server computer program in the third control.

7. The computer program product in accordance with claim 1, wherein the exchanging the first control with the third control occurs while the graphical user interface is being displayed and such that user interaction, with a designtime environment having a designtime version of the client application, is obviated.

8. The computer program product in accordance with claim 1, wherein the exchanging comprises exchanging the first control with the third control by a default binding of the one input and the first one of the two outputs of the client application to the input and output of the third control, respectively.

9. The computer program product in accordance with claim 1, wherein the operations further comprise:

storing the selection of the third control as being associated with a user of the client application.

10. The computer program product in accordance with claim 9, wherein the operations further comprise:

rendering the client application such that modification of the first and third controls as part of the graphical user interface is prohibited.

11. The computer program product in accordance with claim 1, wherein the output of the third control comprises a plurality of output data and the exchanging comprises: a many to one binding of the output data of the third control to a single input data of the client application.

12. The computer program product in accordance with claim 1, wherein each of the first and third controls have respective, associated control logic and the exchanging comprises exchanging the respective, associated control logic of the first and third controls.

13. A method for implementation by one or more data processors comprising:

rendering, by at least one data processor, a graphical user interface of a client application, wherein:

the graphical user interface comprises a first and second control, the client application comprises one input and at least two outputs for services offered by a server computer program, the first control is coupled to the client application such that an input of the first control is bound to a first one of the client application outputs and an output of the first control is bound to the client application input, the second control is coupled to the client application such that an input of the second control is bound to a second one of the client application outputs, and user-generated interaction with the second control causes a display of data at the first control to change, the data received at the client application from the server computer program;

receiving, by at least one data processor, user-generated input characterizing a request to modify the first control and a selection of a third control;

exchanging, by at least one data processor, the first control with the third control by rebinding the one input and the first one of the two outputs of the client application such that the input and output of the first control become input and output of the third control, respectively;

rendering, by at least one data processor, the graphical user interface of the client application as having the third control in lieu of the first control;

receiving, by at least one data processor, user-generated input characterizing interaction with the second control; and rendering, by at least one data processor, the third control to reflect the interaction with the second control, wherein the first control, the second control and the third control are components of the graphical user interface;

wherein there are different access privileges to modify a configuration file of the client application that specifies how to render the graphical user interface of the client application, wherein there are first users having a first access privilege that can modify a first configuration file and there are second users having a second access privilege different than the first access privilege that cannot modify the first configuration file.

14. The method in accordance with claim 13, wherein the rendering the third control is in response to an interaction from the server computer program and the display of the third control comprises information from the server computer program.

15. The method in accordance with claim 13, wherein the method further comprises:

rendering, by at least one data processor, a series of dialog boxes to assist a user to select and map the input and the first one of the outputs of the client application to the output and input of the third control, respectively.

16. The method in accordance with claim 13, wherein the rendering the graphical user interface as having the third control comprises displaying information from the server computer program in the third control.

17. The method in accordance with claim 13, wherein the exchanging the first control with the third control occurs while the graphical user interface is being displayed and such that user interaction, with a designtime environment having a designtime version of the client application, is obviated.

18. A system comprising:
one or more computing systems each including one or more data processors and a memory for implementing:
a first control comprising an input and an output coupled to a computer program at a server;
a second control comprising an input coupled to the computer program at the server; and
a client application comprising one input and at least two outputs for services offered by the computer program at the server, wherein
an input of the first control is bound to a first one of the client application outputs and an output of the first control is bound to the client application input, and
an input of the second control is bound to a second one of the client application outputs, and the client application operable to perform operations comprising:
rendering a graphical user interface on a display device couple to the one or more computing system, the graphical user interface comprising the first control and the second control;
causing a display of data at the first control to reflect user-generated interaction with the second control, the data received at the client application from the server computer program;
receiving user-generated input characterizing a request to modify the first control and a selection of a third control;
exchanging the first control with the third control by rebinding the one input and the first one of the two outputs of the client application such that the input and output of the first control become input and output of the third control, respectively;
rendering the graphical user interface of the client application as having the third control in lieu of the first control;
receiving user-generated input characterizing interaction with the second control; and
rendering the third control to reflect the interaction with the second control,
wherein the first control, the second control and the third control are components of the graphical user interface;
wherein there are different access privileges to modify a configuration file of the client application that specifies how to render the graphical user interface of the client application, wherein there are first users having a first access privilege that can modify a first configuration file and there are second users having a second access privilege different than the first access privilege that cannot modify the first configuration file.

19. The system in accordance with claim 18, wherein: the rendering the third control is in response to an interaction from the server computer program and the display of the third control comprises information from the server computer program.

20. The system in accordance with claim 18, wherein the operations further comprise:
rendering a series of dialog boxes to assist a user to select and map the input and the first one of the outputs of the client application to the output and input of the third control, respectively.

21. The system in accordance with claim 18, wherein the rendering the graphical user interface as having the third control comprises displaying information from the server computer program in the third control.

22. The system in accordance with claim 18, wherein the exchanging the first control with the third control occurs while the graphical user interface is being displayed and such that user interaction, with a designtime environment having a designtime version of the client application, is obviated.

23. The system in accordance with claim 18, wherein:
the controls rendered in the graphical user interface receive corresponding user inputs and relay the corresponding user inputs to the server; and
the server offers the services in response to the corresponding user inputs from a corresponding control.

* * * * *